Oct. 17, 1933.  C. E. IVES  1,931,350

TRAFFIC CONTROL SYSTEM

Filed May 4, 1926  9 Sheets-Sheet 1

Inventor
Clifford E. Ives.
George E. Mueller Atty.

Oct. 17, 1933.  C. E. IVES  1,931,350
TRAFFIC CONTROL SYSTEM
Filed May 4, 1926    9 Sheets-Sheet 2

Fig. 2.

Inventor
Clifford E. Ives.
George E. Mueller, Atty.

Oct. 17, 1933.　　　　　C. E. IVES　　　　1,931,350
TRAFFIC CONTROL SYSTEM
Filed May 4, 1926　　　9 Sheets-Sheet 4

Inventor
Clifford E. Ives.
George E. Mueller Atty.

Oct. 17, 1933.  C. E. IVES  1,931,350

TRAFFIC CONTROL SYSTEM

Filed May 4, 1926   9 Sheets-Sheet 6

Inventor:
Clifford E. Ives.
George E. Mueller Atty.

Oct. 17, 1933.                C. E. IVES                1,931,350
                        TRAFFIC CONTROL SYSTEM
                   Filed May 4, 1926         9 Sheets-Sheet 7

Inventor
Clifford E. Ives.
George E. Mueller Atty.

Oct. 17, 1933.            C. E. IVES            1,931,350
                     TRAFFIC CONTROL SYSTEM
                       Filed May 4, 1926            9 Sheets-Sheet 9

Inventor
Clifford E. Ives.
George E. Mueller Atty

Patented Oct. 17, 1933

1,931,350

UNITED STATES PATENT OFFICE 1,931,350

TRAFFIC CONTROL SYSTEM

Clifford E. Ives, Chicago, Ill.

Application May 4, 1926. Serial No. 106,677

27 Claims. (Cl. 177—337)

My invention relates to crossing traffic signal systems and has to do more particularly with systems and apparatus of the above character for use on street or road intersections and using suitable signal lights, or other signals, for controlling the crossing traffic.

One of the objects of my invention is to provide an improved system and apparatus of the above character more particularly useful in controlling the crossing traffic over an area including a number of crossings or street intersections.

One of the features of my invention is the provision of a system of the above character having an improved centralized control for varying the timing of the distant signals. This improved timing control will be better understood with a more detailed explanation of the various forms of the system coming within the scope of my invention.

For a better understanding of my invention reference is to be had to the accompanying drawings, in which—

Figure 19:
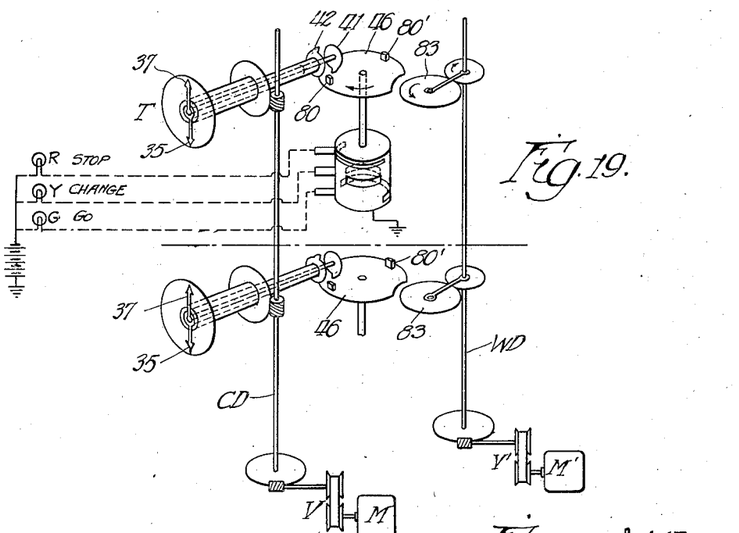
Fig. 19 illustrates diagrammatically one form of my invention, showing the centralized timing units with separate driving motors for the traffic signals and the warning signal and with the timers mechanically connected to be driven in synchronism.

Before taking up the detailed description of the preferred apparatus employed and illustrated in Figs. 1 to 18, I believe an understanding of my invention will be more readily had by briefly describing the system as diagrammatically illustrated in Fig. 19.

In this system of Fig. 19 I employ a plurality of timer mechanisms, two of them being shown separated by the dotted line, said timers being driven in synchronism preferably by a mechanical connection including common driving shafts such as the cycle drive shaft CD connected with a motor M through a variable drive V which diagrammatically illustrates a Reeves drive. These timers are preferably all located at a central station and are thus driven in synchronism by the mechanical drive, which by being varied through the connection V will change the time of the cycle, that is a complete change of traffic control lights through a predetermined length of time for the cycle, such as, for example, one minute. Thus with the timer apparatus making one complete revolution, or one cycle, the red, yellow and green lights R, Y and G, respectively, are successively operated for predetermined periods of time during the cycle of one minute, as has been assumed. The red and green lights control the advance and stoppage of the traffic and the time of their operation may be varied by adjusting the hands on the timer apparatus, thereby varying the control mechanism. The time of the complete cycle may be varied by the variable connection V so that, for example, a cycle may consume three-fourths of a minute or a minute and a half, or any other time within the range of the apparatus. Thus, for example, during certain parts of the day the traffic may be such through the controlled area that a cycle of one minute is preferable. At other times a cycle of a minute and a half may be preferable. This is arranged by adjusting the variable connection V. Although it is desirable to change the time of the cycle as stated, and thus to correspondingly change the time of the red and green lights to increase or decrease accordingly, I find that it is of advantage to maintain all of the yellow or warning lights Y of constant duration. In other words, although the time of cycle may be changed from one minute to a minute and a half, and thus correspondingly increase the time of lighting of the red and green lights, a corresponding increase of the yellow or warning light is undesirable. Therefore I have arranged the synchronously driven timer units so that although the cycle drive shaft may be varied to vary the time of the cycle and thereby also of the red and green lights, the warning or yellow light drive mechanism WD may be maintained constant throughout the entire system. However, should a change of the warning or yellow light be desired for some reason, this may be accomplished by an adjustment of the variable connection V' between motor M' and the common mechanically connected driving system WD.

Referring briefly to the operation of the system of Fig. 19 and assuming that all of the timers are being driven in synchronism by the motors M and M', and referring to the upper timer T, it will be noted that during the rotation of the timer shaft T the arms at the rear end thereof are adapted each to engage its corresponding lug on the switch driving disk beneath it.

In the illustration the switch disk 46 is shown in an interrupted position, with the red lamp lighted. With the disk 46 advanced to this interrupted position, that is, with lug 80 beneath its corresponding arm 42, the notched periphery of the disk is opposite the driving wheel driven from shaft WD, and the contact drum therefore is inert. We will assume it is in a position with the red or stop light on, because of connection with the corresponding contact on the drum. The shaft of timer T, which is continually rotating at constant speed, with its adjustable indicating hands, continues until the arm 42 engages its corresponding lug 80. This pushes the disk ahead sufficiently for the driving wheel 83 from the warning drive shaft WD to engage the periphery of the disk and continue its advance, thereby lighting the yellow or warning lamp Y while the switch drum is rotating to change from red to green. This advance of the switch disk continues for a half turn, that is until the opposite peripheral notch is opposite the driving wheel, at which time the switch drum stops and the green lamp is lighted.

Figures 20, 21, 25:
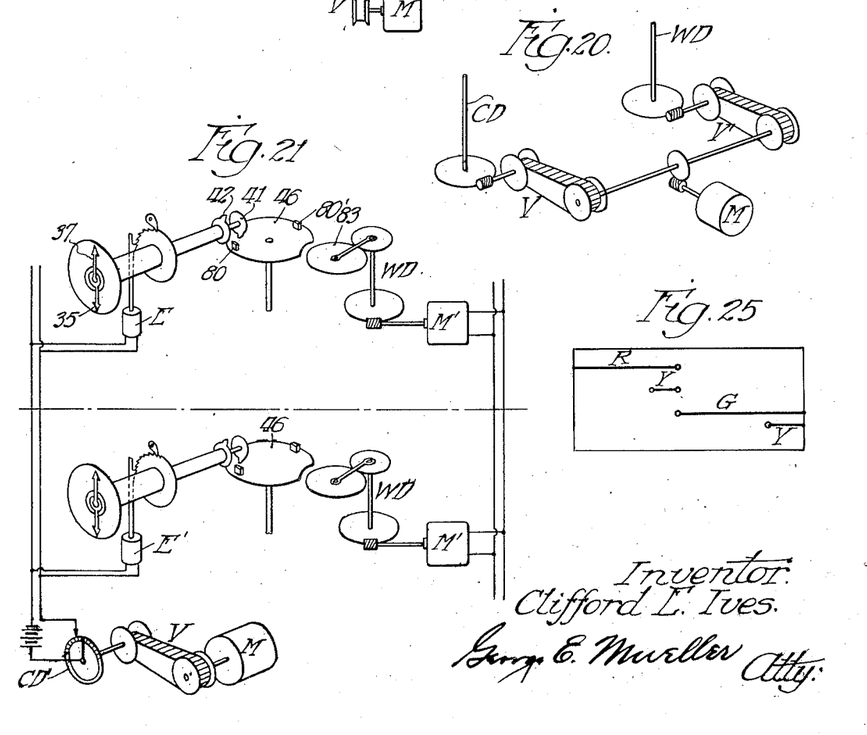
Fig. 20 shows a common driving motor which may be used in place of the separate motors of Fig. 19.
Fig. 21 illustrates diagrammatically an electrical synchronous driving control for the different timer mechanisms which may be placed at the crossings or at a central station.
Fig. 25 is a schematic diagram of the order of lighting of lamps.

A preferred form of overlapping timing for the various lights is diagrammatically illustrated in Fig. 25. That is, assuming that the red or stop light indicated by R is lighted, the yellow or warning change light preferably comes on as stated before the red light is extinguished, and as indicated by the upper line Y in Fig. 25. Thus the yellow light comes on as a warning to indicate that the traffic control lights are to shift. The red and yellow lights then are extinguished simultaneously and at the same time the green or go light comes on, as indicated by the line G. This continues for its predetermined period and at the proper time the yellow light comes on again, as indicated by the lower line Y. The green and yellow lights are then extinguished and the red light again comes on, the lights thus operating successively for successive cycles.

Referring again to the diagram Fig. 19 and to that point in the operation where we assumed that the red lamp was lighted and the switch drum was being advanced to light the yellow lamp. As shown by Fig. 25, the yellow light and red light are then on simultaneously for a short period and extinguished when the coming notch (opposite the one illustrated) in the driven disk reaches the driving wheel 83. The drum has now stopped with the green or go signal lighted. This continues until the arm 41 on the shaft of timer T has come around to engage its corresponding lug 80' on the driven disk. This pushes the disk ahead until it is again engaged by the driving wheel from shaft WD, whereby the disk is driven through its half turn to light the warning or change lamp with the green lamp until they are simultaneously extinguished and the red lamp again lighted.

It will thus be seen that the various lights are successively operated for each cycle.

As previously outlined, it is desirable to change the length of the cycle for various times of the day, according to the traffic. Assuming that the cycle period is to be increased, the variable drive V is shifted accordingly. Thus the red and green lights are operated for a correspondingly increased period.

Should it be desired to change the relative periods of time that the red and green lights are operated for each cycle, this may be accomplished by adjusting the hands on the timer dial, thereby varying the angular relation of the arms at the end of the timer shaft and thus correspondingly varying the length of time of the period of lighting of each of the lamps.

By my improved system I am enabled to maintain the period of operation of all the warning lights constant irrespective of any variation in the cycle or traffic lights; or I may simultaneously vary the period of operation of all of the warning or yellow lights, just as desired. To maintain all of the yellow lights constant when a change of the cycle of all the traffic lights is desired, I simply vary the adjustment of the driving shaft V. But should I also wish to simultaneously change the period of all the yellow lights, I can do this by adjusting the variable drive V'. Thus by adjusting the latter to run the common driving means WD faster or slower, I vary the speed of the contact drum and thus vary the time or period of operation of the warning light.

Thus by varying the speed of the common cycle drive without varying the speed of the warning light drive, I can simultaneously change the time of the cycle of all of the signal posts without varying the warning light; and by varying the speed of the common warning drive for all of the timers I may vary the time of operation of all of the warning lights simultaneously; furthermore, each adjustment is independent of the other, so that either may be made without the other or both used for a desired change.

With the above explanation it is thought a better understanding of the system will be had, so that the operation of the mechanism as illustrated herein may be more readily followed.

It will thus be seen that the central office attendant may vary the adjustment of the individual timers, or all simultaneously, and secure a timing that will permit traffic to pass at the different crossings of the controlled area, at desired periods of the cycle, and the cycle also varied at will for the system as a whole. Furthermore, the timers may be adjusted for simultaneous movement of the traffic at all crossings, or for progressive or coordinate traffic control. The system is very flexible and permits of a great many variations in traffic control for the area under supervision.

As previously stated, the individual timing units are preferably synchronously driven and simultaneously varied when adjustment of the cycle or certain signal lights is desired. Also these individual timing units, each one of which preferably controls the signals at a corresponding crossing or intersection, may be placed at a central station and either mechanically or electrically connected for synchronous driving, or they may be disposed each at its corresponding crossing or intersection and all the timers within the desired area electrically synchronously driven from a common source of power.

However, in any of these arrangements my invention is such that although a constant speed driving means common to all of the timers is used and which driving means may be common through either mechanical or electrical connections, the length of the cycle through which the timers simultaneously operate may be varied as desired, the period of operation of the traffic change warning signals are maintained or varied independent of the length of the cycle period.

In Figs. 1 to 6 I have shown a preferred arrangement of mechanically connected timers which are thus synchronously driven from a common driving source and are preferably located at a central station from which the distant signal lights at the crossings are controlled.

In Figs. 7 to 18 inclusive I show a form of timer mechanism adapted for use in carrying out the system of my invention, this being the form of timer shown in the centralized system of Figs. 1 to 6 and diagrammatically illustrated in Figs. 19 and 20. This mechanism is also capable of use with the systems illustrated in Figs. 21 and 22 by driving the timer shaft with the local driving or stepping magnets controlled from a centralized station.

Referring now more in detail to the mechanism of Figs. 7 to 18, I provide a cycle driving shaft CD and a warning light or change signal driving shaft WD, which shafts are arranged to be connected to adjacent timers so that a plurality of them may be connected and driven from a common driving motor or other source of power. These shafts and the mechanism controlled thereby are supported by a suitable casing adapted to be mounted against the rear face of the panel board 30, preferably of insulating material. The cycle shaft CD is connected to drive the dial shaft 31 through a worm drive 32 the worm gear of which is secured to the outer sleeve 33 of the dial shaft. This dial shaft includes three superimposed elements, being the inner shaft 31, the intermediate shaft or sleeve 34 and the outer sleeve 33. These shafts are connected to the dial and indicating hands on the face thereof, which are so related that they can be relatively adjusted but secured together to move as a unit to thereby adjust the relative positions of the starting cams at the rear end of the dial shaft for controlling the starting of the switch mechanism.

Figure 7:
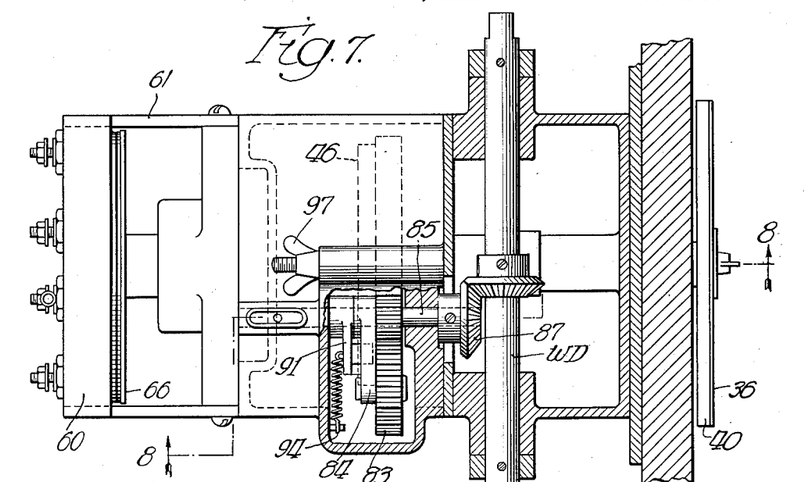
Fig. 7 is a top plan view of a timing apparatus unit with parts in section to show the interior mechanism.
Figures 8, 9, 10:
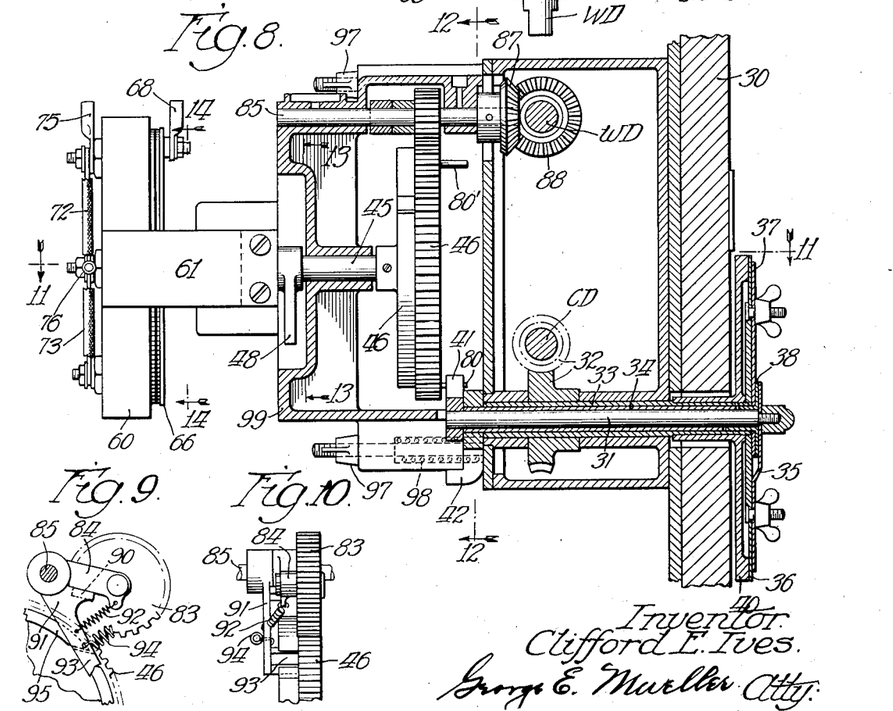
Fig. 8 is a sectional view along the line 8—8 of Fig. 7, part of which is in section to show the interior mechanism.
Fig. 9 is a detail view of the gear controlling or driving mechanism, said parts being also shown in Fig. 12 and a top view in Fig. 7.
Fig. 10 is a right end elevation of Fig. 9.

To this end the central shaft 31 is connected to the indicator hand 35 which is adapted to be adjusted and secured to the dial face 36 by the thumb screw shown. The indicating hand 37 is secured to the intermediate shaft 34 and carried therewith through attachment to the flanged collar 38 which is secured to the intermediate shaft 34. The dial which includes the face portion 36 having a circular slot 39 in which the hand clamping screws run, and the rear dial portion 40 to which the face 36 is rigidly attached, is secured to the outer or driving sleeve 33 to which the worm gear is fastened. Thus with the dial and hands all secured together when adjusted the entire dial shaft rotates as a single unit.

To the rear end of the dial shaft is secured the starting cams which start the advance of the switch mechanism, these starting cams including the element 41 which is secured to the central shaft 31, and the other cam element 42 which is secured to the intermediate shaft 34. Thus by adjusting the hands 35—37 on the dial, the cams 41—42 are angularly varied accordingly.

Figures 16, 17, 18, 26:
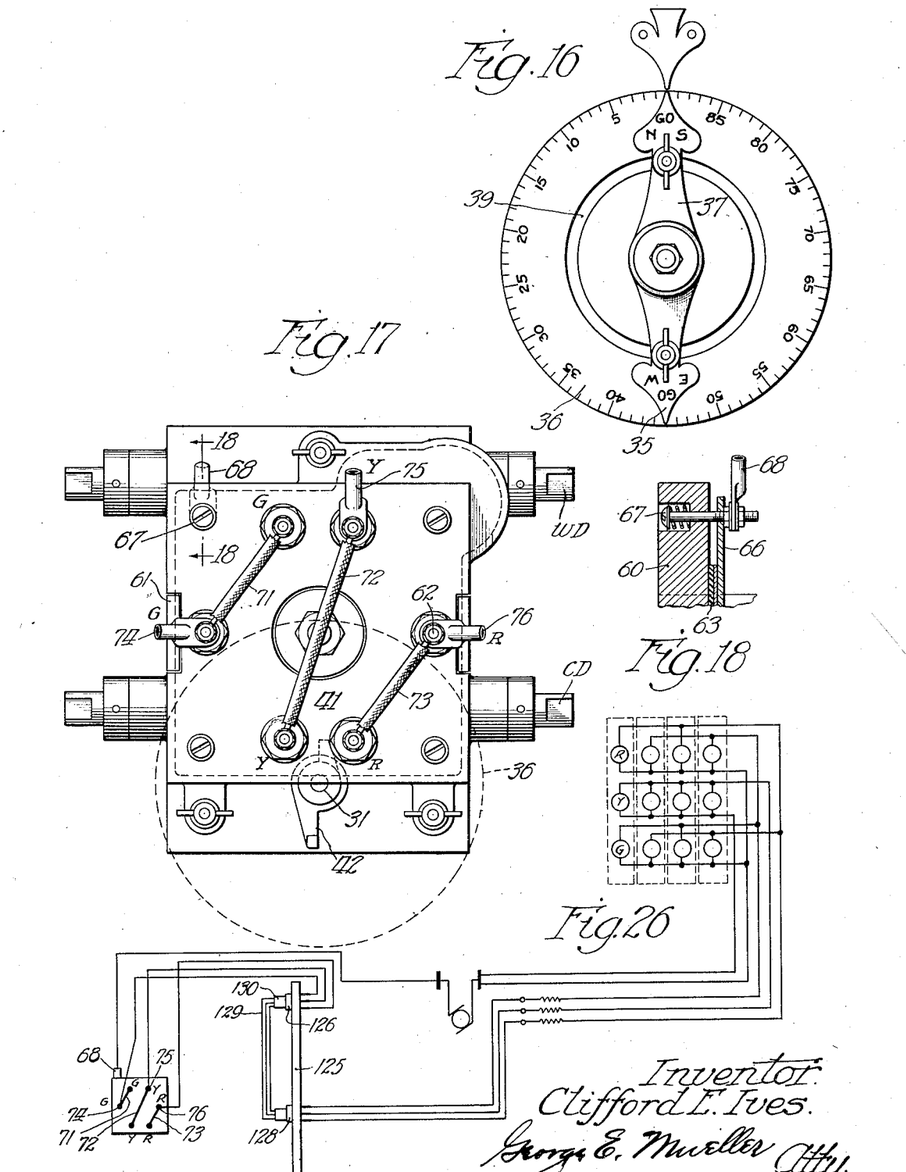
Fig. 16 is a face view of the dial and adjustable indicating hands.
Fig. 17 is a rear elevation of one of the timer units.
Fig. 18 is a sectional view along the line 18— 18 of Fig. 17, showing the yielding support for the contact disks and blocks.
Fig. 26 is a wiring diagram.

It will be noted that the dial 36 is numbered and spaced with indicating lines dividing the face of the dial into ninety sections, which divisions may be used as a guide in adjusting the timing of the cams. For example, assuming that the timer is running on a ninety second cycle, that is one complete revolution of the dial in ninety seconds, this would then indicate the relative timing of the cams in seconds. By varying the time of the cycle or revolution of the dial the spacing would not then correspond to seconds, but would indicate and show the division of the cycle between the north and south traffic and the east and west traffic. The adjustment as shown in Fig. 16 indicates an equal division of the cycle, that is one-half of the cycle for the traffic in one direction and one-half of the cycle for the traffic in the other direction.

It will thus be seen that any desired division of the cycle may be secured by adjusting the hands on the face of the dial.

At the rear of the timer unit is the switch mechanism which is operated by the shaft 45, said shaft carrying a gear 46 the initial movement of which is started by the cams 41 and 42 and then continued by connection with the driving shaft WD. This gear 46 has an intermittent advance, that is for each cycle or revolution of the timer dial the gear 46 makes one complete revolution but in half revolution advances. In other words, it is started by the cam 41 and makes a half revolution and stops and is then again started by cam 42 so that it continues another half revolution and stops. During this complete revolution of gear 46 the switch mechanism at the rear of the timer advances its contact closing plate by four snap action advances, the four positions being indicated by the dotted lines in Fig. 14.

Figures 12, 15:
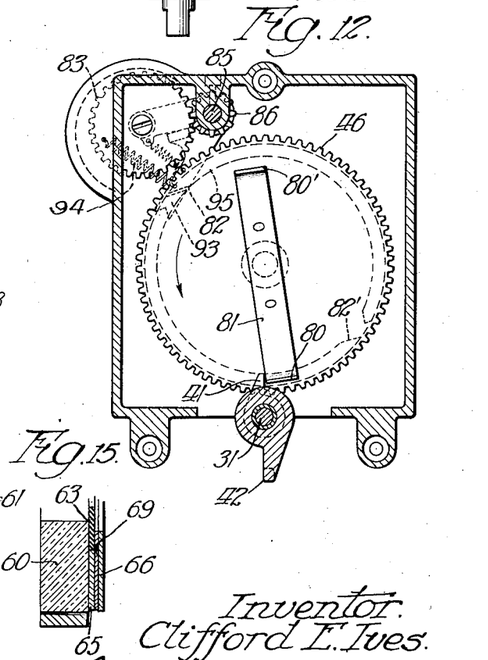
Fig. 12 is a sectional view along the line 12—12 of Fig. 8.
Fig. 15 is a sectional view along the line 15— 15 of Fig. 4, showing the contact or switch plates.

As previously stated, the gear 46 is started in each half revolution of a cycle by arms 41 and 42 successively, which arms are carried at the end of the timer dial shaft. This is brought about in the initial or first movement by the arm 41 engaging the extension 80 on the bar 81 which is secured to the gear 46 as indicated in Fig. 12. This initial movement of gear 46 causes its inner cam face 82 to draw the driving pinion 83 into mesh with the teeth of gear 46 so as to continue the movement thereof for its half turn. The driving pinion 83 is normally out of mesh with gear 46 but is carried upon an arm 84 (Fig. 9) pivotally mounted upon a shaft 85 which carries a driving pinion 86 permanently in mesh with gear 83. The said shaft 85 carries a bevel gear 87 in mesh with a corresponding gear 88 carried upon the constantly rotating shaft WD. Thus although shaft WD is constantly rotating and the driven pinion 83 is constantly rotating, it is only while the gear 83 is drawn into mesh with the main switch driving gear 46 that the gear 46 continues through its half rotation. Going back to the supporting and intermeshing mechanism which controls the driving pinion 83 and referring again to the arm 84 which carries pinion 83, this arm 84 rests against a lug 90 of a second arm 91, which is freely pivoted upon the shaft 85 but with the two arms 84 and 91 yieldingly drawn together by a spring 92. Arm 91 carries the lateral extension 93 which rides upon the inner cam surface 82 of the main gear 46. Arm 93 is drawn toward this main surface 82 by a spring 94, but because of the yielding connection between the cam arm 91 and the gear carrying arm 84 the gear 83 is not positively forced against the larger gear 46 when drawn toward it, but is permitted to properly mesh. This continues the advance of gear 46, pinion 83 and gear 46 being held together so long as the arm extension 93 is riding on the inner periphery of the ring 95. And this continues for a half revolution of gear 46 at which time the extension 93 drops into the opposite notch 82'. That is, when the gear 46 has made a half turn and the notch 82' reaches the extension 93, the spring 94 drops the extension 93 into the notch and thereby moves the pinion 93 out of mesh to stop the further advance of the gear 46. During this half revolution of gear 46 the timer dial shaft is rotating, but at a slower speed than the gear 46 so this latter gear comes to rest before the other timer arm 42 comes into play. Thus the arm 80' of gear 46 has moved around into the position occupied by arm 80 in Fig. 12 and the gear has come to rest, remaining so until the timer arm 42 comes around and engages the arm 80' to give another initial advance to gear 46 so that it is driven through its second half revolution and again comes to rest.

It will thus be seen that for each revolution of the timer dial shaft, that is for each cycle of the timer, the gear 46 is advanced through one complete revolution with an intermediate stoppage and the signals operated through one cycle.

Figure 13:
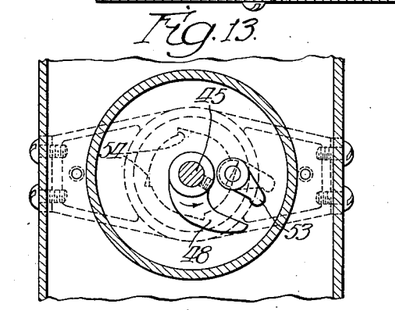
Fig. 13 is a sectional view along the line 13—13 of Fig. 8.

Now as to the operating connection between the gear 46 and the switch mechanism that controls the lamps, this includes the driving shaft 45 which is supported in the stationary bearing 47 and carries an arm 48 rigidly attached thereto. The switch carrying shaft 49 is rigidly supported in a housing 50 which is rotatably supported in the bearing 51. This rotatable housing 50 carries a tripping shaft 52 which carries an arm 53 pinned thereto so that when this arm 53 is engaged by the arm 48 the tripping shaft 52 has a cutaway end 52' which acts as a tooth or pawl to successively engage in the teeth 54 in the ring 55 which is securely set in the casing 51 so that it is fixed therein and not rotatable. A spring 56 encircles the tripping shaft so as to tend to press the pawl end 52' into engagement with a tooth 54 as indicated in Fig. 13. The driving shaft 45 and switch shaft 49 are connected by a spring 57, so that as the shaft 45 advances it winds up the spring 57 and for each quarter turn of the shaft 45 the shaft 49 is released through the action of the tripping pin arrangement described so that four snap action advances of the shaft 49 and switch mechanism carried thereby are effected.

Figure 11:
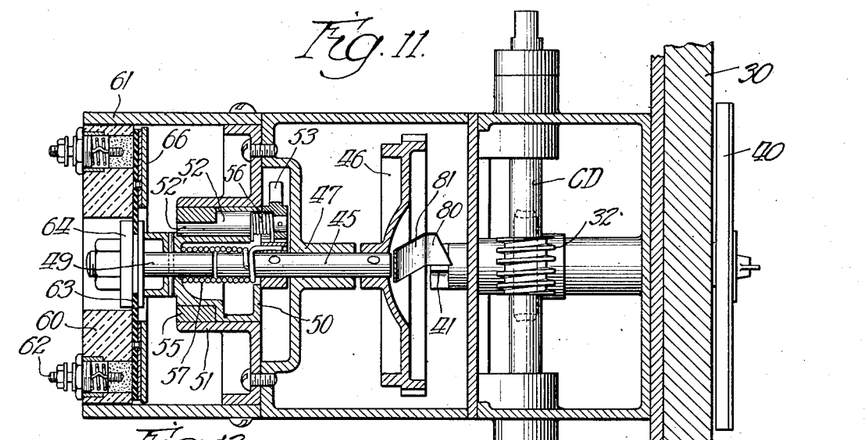
Fig. 11 is a sectional view along the line 11—11 of Fig. 8.

Assuming that this advance and tripping mechanism is in the position indicated in Figs. 11 and 13, and assuming further that shaft 45 is rotating through the advance of gear 46, arm 48 which is carried by shaft 45 thus approaches the tripping arm 53 which is carried in the housing 50 and which is stationary because of the toothed end 52' of the tripping shaft 52 being pressed into one of the teeth 54. However, as arm 48 approaches and moves the tripping arm 53, tripping shaft 52 is rotated until its pawl 52' has rotated out of engagement with tooth 54. Thus the housing or switch carrying frame 50 is released so as to be rotated by snap action movement because of spring 57 for a quarter turn. Of course, as soon as frame 50 starts to advance, the tripping arm 53 leaves the arm 48 so that the locking pin 52 is free to rotate to engage the next tooth 54 which is one quarter turn advance of the previous tooth. Thus the switch shaft has made a quarter turn advance and stops. However, shaft 45 is continuing in its advance and when its arm 48 catches up with tripping arm 53 again, this arm rotates the locking pin 52 to again release the switch for another quarter advance. Thus for one complete revolution of the driving gear 46, the switch mechanism makes four intermittent operations or advances. In other words, for each cycle of operation of the timer the switch is actuated four times to successively light and extinguish the signal lamps. Of course, any number of operations of the switch may be provided for each cycle of operation of the timer, this depending upon the control desired.

Figure 14:
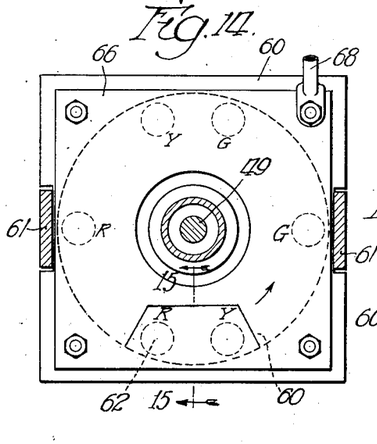
Fig. 14 is a sectional view along the line 14—14 of Fig. 8, showing the switch mechanism.

Now as to the switch mechanism as carried upon the end of the switch shaft 45, this is in the form of a snuff-arc switch, although any suitable switch may be used. In the form illustrated I provide a mounting lock 60 of suitable insulating material and loosely inserted in the frame 61 which is attached to the timer housing. This frame is rectangular, as indicated in Fig. 14, so that the block 60 supported therein is held against rotation. This block 60 carries a plurality of contact members 62, the switch contact end of which presses against the switch plate 63 which is clamped between the washers 64 at the end of the switch driving shaft 49. This plate 63 is circular and made of insulating material and has a contacting segment 65 set therein, this segment being in the form of a truncated sector as indicated by the dotted lines in Fig. 14 where it is shown in one of the four positions it assumes during the operations of the switch. This plate 63 is yieldingly held between the contact carrying block 60 and an inner plate 66 by reason of the spring held clamping bolts 67, as indicated in Fig. 18. A conductor terminal or binding post 68 is connected to the plate 66 through one of these bolts 67, as indicated in Fig. 18, so that the plate 66 acts as a conductor to the contact segment 65 so as to conduct or extend the current through to the proper stationary contacts 62. The rotatable contact 65 which is inserted in the plate 63 is also in electrical contact with the intermediate annular metallic ring 69, which ring is riveted to the insulating plate 63 as indicated in Fig. 11. Thus this ring 69 is in direct contact with the stationary plate 66 and the current thus is in fact carried from plate 66 through the ring 69 to the contact segment 65.

The desired arrangement of the stationary contact 62 is illustrated in Fig. 17, which is a rear view of the timer, there being six such contacts 62 and the color of light controlled thereby is indicated by the letter applied to each terminal. Thus "R" indicates red, "G" indicates green and "Y" indicates yellow. These same contacts are similarly indicated in Fig. 14, which is an inner view of the timer, that is looking toward the switch contacts from the inside of the timer.

It will be noted that the two green terminals 62 are connected together, the two yellow connected together and the two red connected together by conductors as 71, 72 and 73. Connector terminals 74, 75 and 76 are provided for connecting the conductors leading from the said lights to these switch contacts.

Thus when the connector segment 65 is in its lowermost dotted position as indicated in Fig. 14, the red and yellow lamps are lighted, the red light stopping the traffic and the yellow light indicating that a change is to take place. Thus when this segment moves in the direction indicated by the arrow in Fig. 14 to its next position, the green lamp is lighted. When the warning or traffic change lamp is to be lighted with the green light to indicate the next change, the segment is moved to its second or upper position to keep the green lamp lighted and also light the yellow lamp. Then when the next traffic change is to take place, the segment is moved to its next position, thereby extinguishing the yellow and green lamps and lighting the red light. When the next traffic change is to take place and the warning lamp is first lighted, the sector is moved to its lower position again, thereby maintaining the red lamp lighted and lighting the yellow light. Thus these various changes take place for each cycle of operation.

It will be noted that the timer mechanism is so assembled that it may be readily taken apart or the switch driven portion disconnected. This may be brought about by unloosening the thumb nuts 97 whereby the springs 98 press the rear gear carrying casing 99 away from the front casing, thus disconnecting the bevel gears 87 and 88 and moving the arms 80, 80' carried by gear 46 back out of the path of the dial shaft arms 41—42. Thus although the timer shafts CD and WD continue to rotate, the switch mechanism is inert.

Fig. 26 represents diagrammatically the wiring from the timer unit to the signal lamps at the street intersections and showing the connections extending through the plug panel board. Thus the green, yellow and red contacts 74, 75 and 76 at the rear of the timer are connected through the three conductors to the plug panel board and then extend out to the intersection. The lamps at the intersection are represented as positioned in four lamp posts each having green, yellow and red lights. The diagram shows four such posts, one facing north for controlling the traffic coming from the north, the next post facing east for controlling the traffic coming from the east, the next post facing south for controlling the traffic coming from the south, and the next post facing west for controlling the traffic coming from that direction.

Thus when the timer switch mechanism closes current to the green contact 74, the green or go lamps permitting east and west traffic are lighted. When the switch moves on to close the circuit to the upper green and yellow contacts including 75, the green east and west lamps stay lighted and all the yellow lamps are lighted to indicate a change is to take place.

It will be noted that while the green lamps are lighted to permit east and west traffic, the red lamps in the posts facing north and south are lighted so as to stop the traffic in those directions while the east and west traffic is moving.

When the switch moves from the green and yellow lights to its next contact which is 76, this lights the red lamps in the posts facing east and west so as to stop the traffic which had been moving there and lights the green lamps in the posts facing north and south, permitting the traffic to move north and south. The switch then moves down to connect the yellow and red contacts in the lower position, thus lighting the yellow lamps again on the four posts to indicate a change in traffic signals. After the elapsed period the switch moves over to its next position which is over the green contact 74, thus bringing the lamps back to their first described position. Thus the signals have been operated through one cycle.

Thus it might be stated in general that when the north and south green lamps are lighted, the east and west red lamps are lighted. When the east and west green lamps are lighted, the north and south red lamps are lighted. Before each change of traffic lamps the yellow or change lamps are lighted. Thus the signal lamps are successively lighted for each cycle of the timer.

With the connections at the rear of the timer made as indicated in Figs. 17 and 26, the red and green lamps and the yellow or change lamp have an overlapping operation as described. Should it be desired to have the lamps light without overlapping, that is red, then yellow, then green, then yellow, then red, etc., it is only necessary to remove the connectors 71, 73 at the rear of the timer and thus successive individual operation is secured.

Referring now more in detail to the centralized system of Figs. 1 to 6, I provide a suitable frame or mounting for the timer units including suitable panels 30 carried by a marginal frame and upon which panels the units are mounted.

Figure 1:
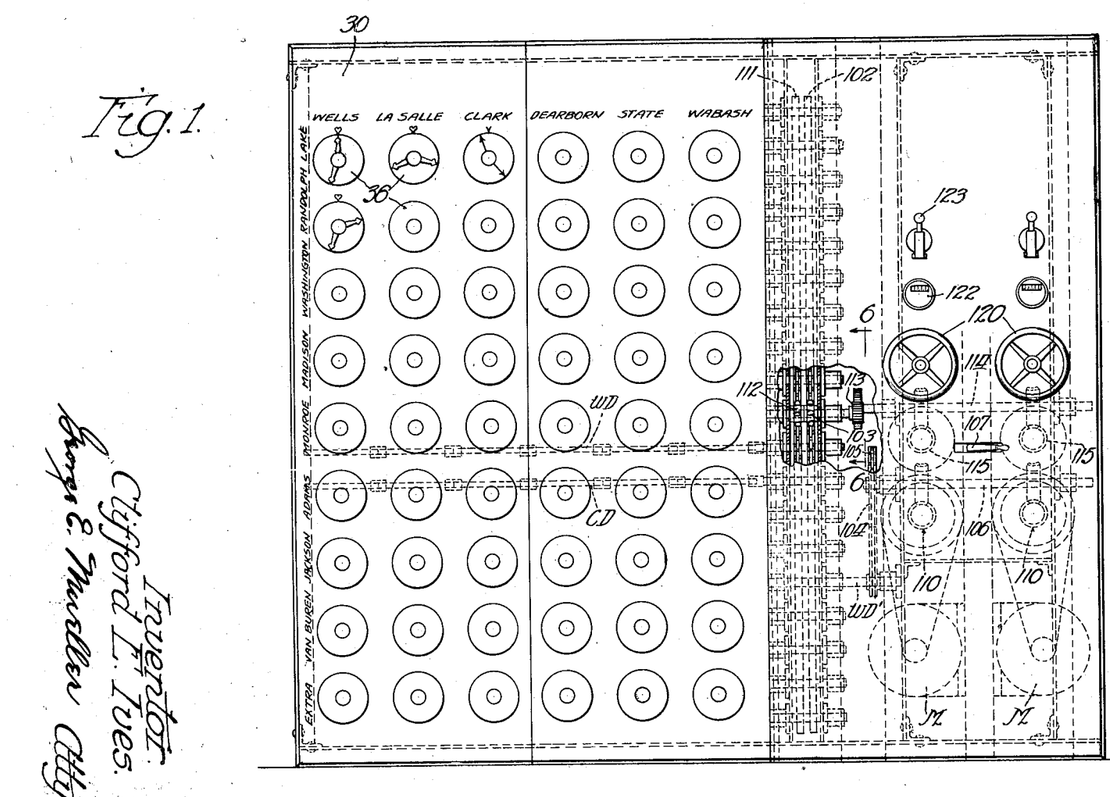
Fig. 1 is a front elevation of the central panel or main frame which supports the timing apparatus for controllng the distant signals.
Figure 2:
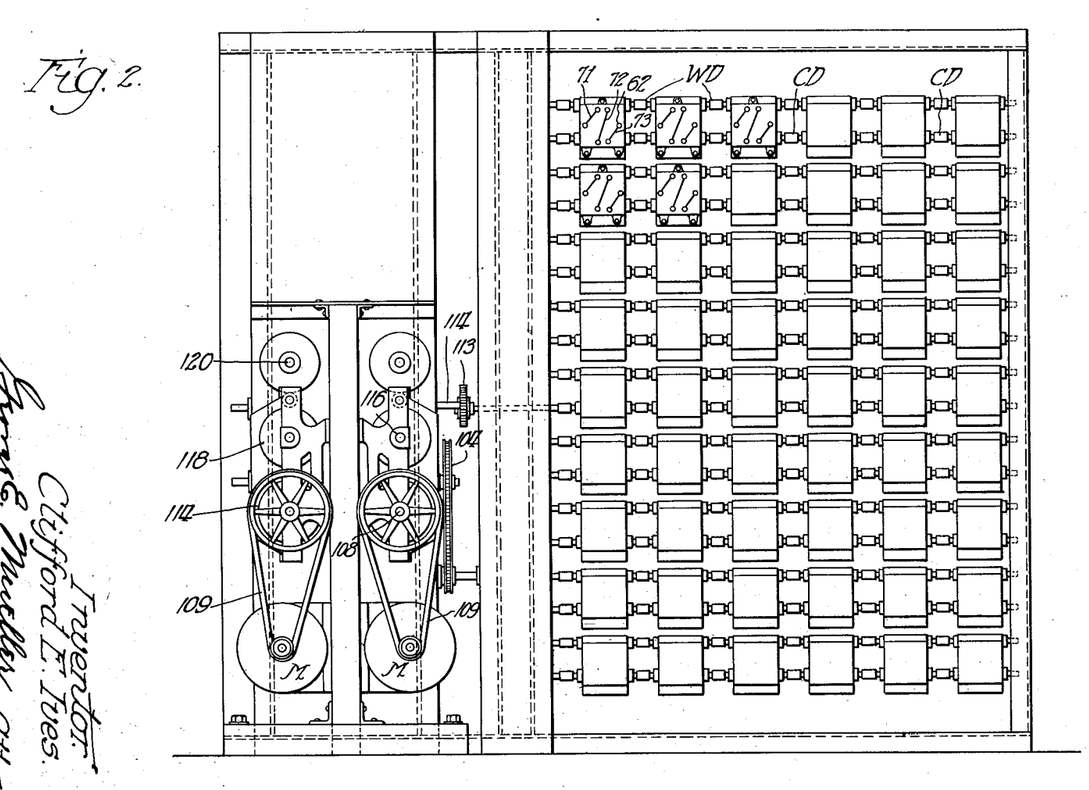
Fig. 2 is a rear elevation of Fig. 1.
Figure 3:
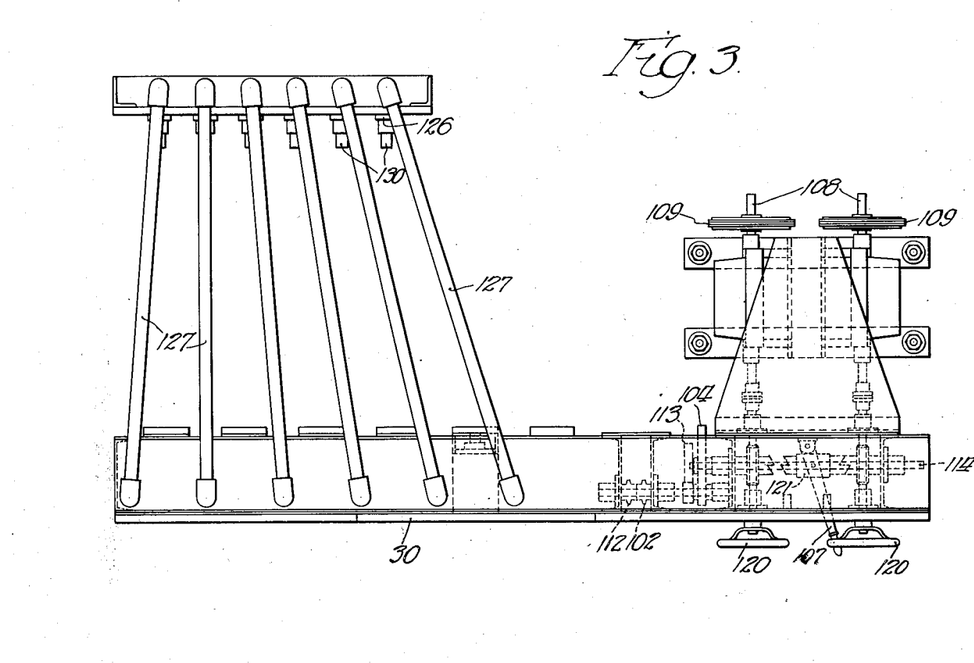
Fig. 3 is a top plan view of Fig. 1.
Figure 4:
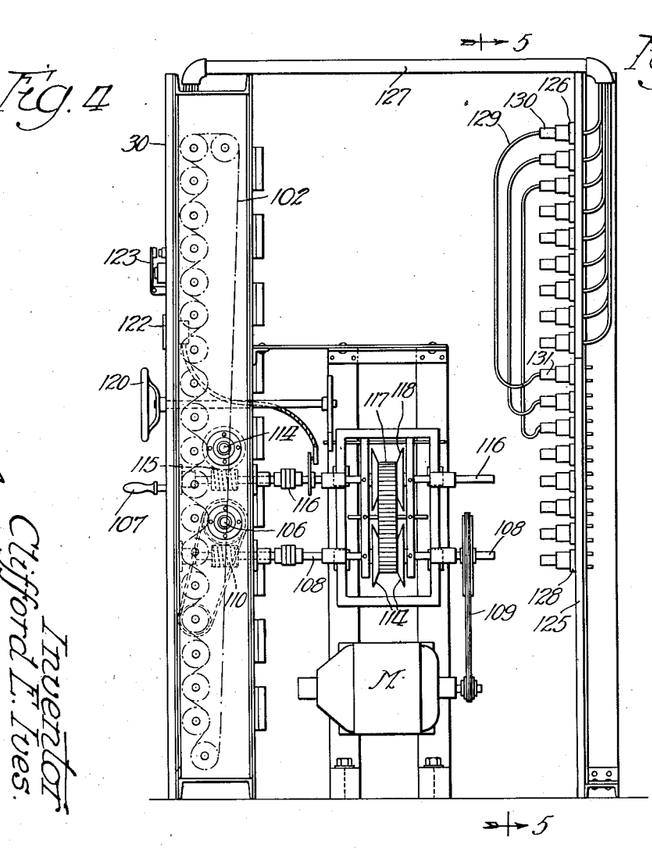
Fig. 4 is a right end elevation of Fig. 1.
Figure 5:
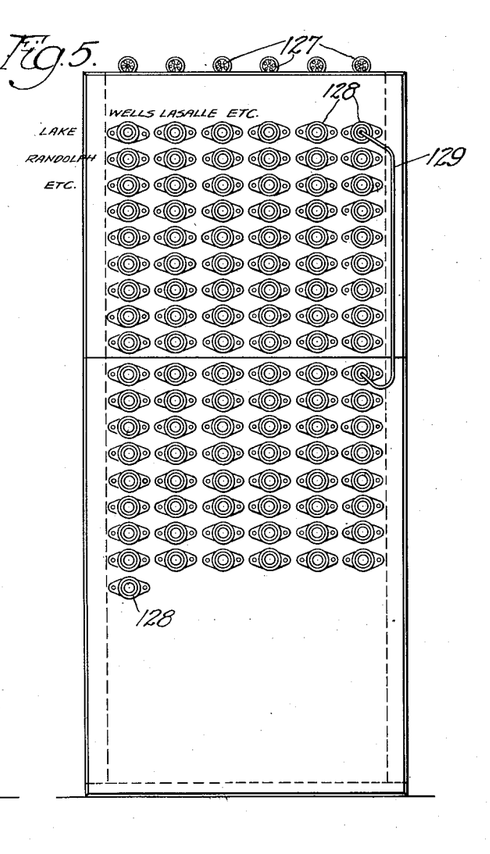
Fig. 5 is a face elevation of the rear connector panel board, the view being along the line 5—5 of Fig. 4 in the direction of the arrows indicated thereon.

These timer units are preferably disposed upon the face of the panels so that their position will indicate the intersection controlled thereby. For example, the system illustrated and the face of which is shown in Fig. 1 is arranged for controlling the so-called "Loop-area" of the city of Chicago. For instance, the north and south streets are indicated at the top of the rows, such as Wells, La Salle, etc. The east and west streets are indicated by the horizontal rows marked to the left, as Lake, Randolph, etc. Thus the timer in the upper left hand corner is the one that controls the lights at the corner of Wells and Lake Streets. The second timer from the upper left hand corner controls the corner of Wells and Randolph Streets, and so on down the column. It will thus be seen that it can be readily determined at a glance where any timer for a definite crossing is positioned upon the board, so that its operation can be determined. Also if any special crossing timer is to be adjusted, the timer can be readily selected.

Figure 6:
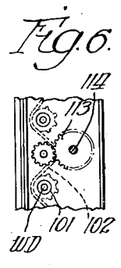
Fig. 6 is a view along the line 6—6 of Fig. 1 in the direction of the arrows indicated thereon.

Each timer as previously described, has the cycle shaft CD and the warning light driving shaft WD, these being connected in common across the board as indicated by the dotted lines in Fig. 1. Each shaft WD then extends toward the right of the panel board and at the end of the shaft is a sprocket 101 which is fixed to the shaft and on which a chain 102 runs and extends over all of the fixed sprockets of the warning drive shaft WD. This chain 102 runs in a zig-zag fashion, as indicated in Fig. 6, being supported on an idler sprocket 103 on each of the shafts CD, which latter shafts are otherwise driven as will be described. These shafts WD are driven by a chain 104 which runs over a sprocket secured to an extension WD' of one of the shafts WD, as shown in Fig. 1, said chain also running over a larger or driving sprocket 105 fixed to a shaft 106 common to the two driving motors M either one of which may be connected to the shaft by the switching lever 107 which extends through the face of the panel. Between each motor M and the shaft 106 is a shaft 108 driven directly by the motor through the belt 109, said shaft 108 being connected to shaft 106 through the worm gear 110.

Thus in the preferred form of driving mechanism as shown in Figs. 1 to 6, the warning drive is of constant speed through the said driving connections between motor M and shaft 106, which latter shaft extends through chain 104 to shaft WD'.

Although a constant speed is preferably employed for the warning light so as to maintain this lamp lighted for a predetermined period, irrespective of the change of cycle, I contemplate also employing a variable speed so as to vary the period of operation of the warning light.

Now as to the cycle drive for the timers, this is preferably arranged so that the time of the cycle may be varied without varying the period of lighting of the warning lamp. Like all of the warning drive shafts WD, the cycle drive shafts CD are connected in common by means of a common chain 111 which runs over the sprockets 112 which are fixed to the cycle drive shafts CD, the intermediate or idle sprockets in this case rotating freely on the shafts WD. The driving of shafts CD is brought about through the gear connection 113, the larger gear of which is fixed to the driving shaft 114 which is connected through worm gearing to be driven by either motor M, according to which is cut in by the lever 107. Thus referring to Fig. 4, it will be noted that this shaft 114 extends through worm gearing 115 driven from shaft 116. This shaft 116 is connected to the motor through a suitable variable connection, preferably a Reeves drive, having a conical belt 117 riding over two pulleys 118—119 the flanges of which are simultaneously variable so that by adjusting them the speed of the shaft 116 is varied although the speed of the motor M remains constant. The adjustment of these pulleys 118—119 is brought about through a hand wheel 120 extending from the face of the panel board, so that an attendant may adjust or vary the speed of the mechanism and thus of the cycle by rotating the hand wheel 120.

As previously stated, alternate driving motors are provided so that either one may be cut in in case of trouble, this shift being brought about through the hand lever 107 which operates the clutch sleeves 121, there being such a clutch on each of the shafts 106 and 114 so that they are both simultaneously connected to either motor according to the operation of the lever 107.

A tachometer 122 is provided and is connected with the cycle drive and timed so as to indicate the number of seconds per cycle. Thus when the attendant wishes to vary the time of the cycle the hand wheel is adjusted and the tachometer indicates when the desired time of cycle is reached.

A motor start relay 123 is also mounted upon the face of the panel for each of the driving units through which the corresponding motor circuit is closed and automatically held closed.

To the rear of the apparatus panel 30 is the plug panel board 125 having a plurality of jacks 126, there being one such jack for each timer unit to which it is connected by conductors running through the conduit 127. Each jack 126 has three contacts connected with the corresponding timer as indicated by the three conductors in Fig. 26. At the lower part of the plug panel board is a plurality of jacks 128 from which the conductors run out to the various signal posts, as indicated in Fig. 26. Thus each jack 128 corresponds to the signal posts at a certain corner and each jack 126 corresponds to a certain timer unit on the timer panel board.

These two sets of jacks may be interchangeably connected by plug ended cord pairs 129, the plugs 130—131 of each cord pair being adapted for insertion in the jacks. This variable interconnection of timer units and signal posts through the jacks and cord pairs has various advantages. One of the features is that should any timer unit become disabled the corresponding plug 130 may be removed from its jack and inserted in the jack of one of the extra timers shown along the lower row of the timer panel board.

*Fig. 19*

Fig. 19 illustrates diagrammatically a form of my invention in which the common cycle drive and common warning or change light drive are each operated by a motor through a variable drive, as previously described. Both shafts CD and WD are constantly rotating and are common to a plurality of individual timer mechanisms, two of them being shown separated by the dotted line. Any number of such timers may be connected to the common power or advancing means. The timer dials T are constantly rotating, because of the worm connection with the shaft CD. The warning light drive, however, is shown disconnected in each case and is only connected when the switch is started in its rotation by the timer cams 41 or 42.

In the mechanism as shown at the upper timer T the red lamp is in circuit and is lighted. The switch contacts are shown inert. The timer shaft is of course rotating at constant speed and when the arm 42 reaches and engages the lug 80 on the switch plate, the switch is started in its rotation until the periphery of the driving plate 46 is engaged by the driving wheel 83 which corresponds to the driving pinion in the timer mechanism previously described and which wheel 83 is driven by the shaft WD. Thus the continuation of the switch drum by the driving wheel 83 causes the yellow or warning change lamp to be lighted during the half revolution of the drum and during this period the red lamp also continues lighted, as shown by the diagram Fig. 25. The red and yellow lamps are thus overlapping during the end of the red light period. Upon completion of the warning light drive, that is in the diagram a half revolution of the drum, the yellow and red lamps are effaced and simultaneously the green lamp is lighted before the switch drum comes to rest. This stopping of the movement of the switch drum is caused by the opposite notch in the disk 46 reaching the driving wheel 83. The switch drum is now inert with the green lamp lighted, but the timer shaft, it will be remembered, is continuing its constant rotation. The green lamp remains lighted and when the arm 42 comes around to effect the next change in the signals, this arm engages the stud 80' which is now beneath this arm and the disk 46 is started in its advance for the second half revolution of its cycle until it is again engaged by the driving wheel 43 to complete the second half revolution and thereby the complete cycle. During this last half revolution the green lamp remains lighted while the yellow or change lamp is again lighted as indicated in the diagram Fig. 25 until they are both effaced and the red lamp again lighted.

It will thus be seen that for each complete cycle or revolution of the timer mechanism, the traffic lamps are successively lighted according to the periods determined by the adjustment of the mechanism.

Assuming that the timer has been running at one minute per cycle and the traffic is changing as it does during certain hours of the day, and it is desired to reduce the cycle to forty seconds. Accordingly, the variable speed mechanism V is adjusted, shown as a Reeves drive in the other drawings, until the proper speed is reached. Thus with the time reduced from sixty seconds to forty seconds for a cycle, the period of lighting of the red and green lamps is correspondingly reduced. However, if the drive for the cycle shaft CD only is varied, the time of lighting of the warning lamp remains constant. This is usually most desirable, because although the time of running for the traffic in cross directions may be varied, the time of warning is to remain constant.

This is effected because the cycle drive shaft CD only affects the time of the cycle, while the period of lighting of the warning lamp is determined by the speed of the warning drive and this is not varied by the cycle drive variation.

However, should it be desired to vary the period of lighting of the warning or change light, this is accomplished by adjusting the variable drive V' so as to change the speed of shaft WD. By increasing or reducing the speed of this shaft the speed of the switch drum during each half revolution is correspondingly changed to increase or reduce the period of lighting of the yellow or warning lamp.

As indicated by the adjustment of the hands 35 and 37, the red and green lamps are each lighted for the same period of time during the cycle. That is, the switch drum is stationary for each half cycle for the same period of time and accordingly the red and green lamps are lighted for the same period.

Assuming that the traffic for the particular crossing controlled by timer T is such that more time is required in one direction than in the cross direction. Accordingly, the hands 35 and 37 are adjusted to vary the angular relation of the starting arms 41 and 42 to vary the adjustment or period of lighting of the lamps, as indicated by the description of the apparatus previously given.

It will thus be seen that the attendant at the central station may vary the adjustment of each timer so that the traffic may pass at its corresponding intersection at the desired periods of the cycle. Furthermore, the timers may be adjusted so that the corresponding lamps of all the intersections operate in synchronism so as to secure simultaneous advance and stopping of traffic at all intersections. Or if desired, the timers may be adjusted to secure successive actuation or so-called coordinate traffic control. By varying either one or both of the drives any timing may be secured or a constant or variable speed adjustment made.

*Fig. 20*

In Fig. 20 I have shown only the power drive for the constant and warning drives, using a single motor M in this case connected through a common shaft through the two variable drives V and V'. Otherwise the controlled timing apparatus of Fig. 20 may be the same as that shown in Fig. 19.

*Fig. 21*

In Fig. 21 I have shown another modified form in which I use a common or simultaneously controlled drive for all of the cycle drives of the different timers, using common electrical impulses transmitted to the various timers so as to keep them in synchronism by electrical drive, as distinguishing from the common mechanical drive of Figs. 19 and 20. In Fig. 21 I have shown an individual motor M' for each of the timers, instead of the common motor or common mechanical drive of Figs. 19 and 20.

Thus in the arrangement shown in Fig. 21 the individual timers may be located at the intersection controlled thereby or they may all be located at a central station.

In the arrangement of Fig. 21 the timer shaft in each case is driven by a suitable electromagnet E, all of said magnets being driven from a common impulse or driving source CD', which instead of being mechanically connected to all of the timers as in the previous figures, is electrically connected to transmit impulses to drive all the timers in synchronism. A driving motor M is provided which is connected through the variable drive V to the impulse or cycle drive CD' so as to drive it at constant speed. This speed, of course, may be varied by the adjustment of V so as to correspondingly vary the speed of the cycle drive and therefore the period of the cycle.

Fig. 22

Figure 22:
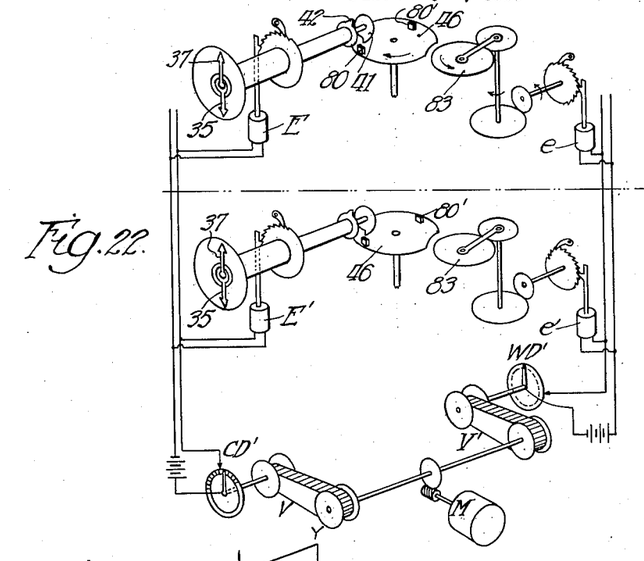
Fig. 22 shows a method of electrically connecting the timer units for electrical synchronous driving from a single source of power.

In Fig. 22 I have shown another modified form of my invention, being similar to Figs. 20 and 21, that is a combination of both in that I provide a common driving motor connected through variable driving means V and V' to the cycle drive CD' and warning light drive WD'. In the system of Fig. 22 I drive the independent warning drives each by an electromagnet e, the same as the electromagnet E for the cycle drive. Thus the cycle drive or timer shafts of the different mechanisms are driven in synchronism and the speed simultaneously varied by the adjustment of the Reeves drive V. Thus in Fig. 22 the cycle drive time may be varied without varying the warning light period.

In Fig. 22 the warning light period of operation may be varied if desired by the adjustment of the Reeves drive V' so as to increase or decrease the speed and thereby the period of lighting of the warning or change lamp. In the case of the warning lamp all of the timers are simultaneously adjusted and this control as shown in Fig. 22 is from a central station.

The various timer mechanisms may be located at the intersections controlled thereby, or they may all be placed at the central office, just as desired.

Fig. 23

Figure 23:
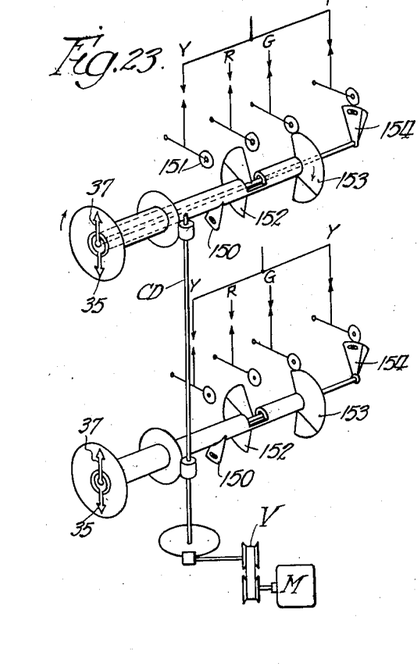
Fig. 23 shows another modified form in which the timer units are mechanically connected for synchronous driving.

In Fig. 23 I show another modified form of my invention comprising a plurality of timer mechanisms, of which two are shown. However, any number of such mechanisms may be connected to the common driving shaft CD which is driven at a constant speed by the motor M through the variable drive V so that the speed of the shaft CD and thus of the timers may be simultaneously varied.

In this form of my invention I control all of the lamps from a single timer shaft which for each mechanism is rotated as a unit. In this respect the system of Fig. 23 differs from the previous forms in that the yellow warning or change lamps have their period of operation varied with any variation of the timer drive shaft. It will be remembered that in the previous forms of my invention the period of the cycle may be varied but the period of lighting of the warning lamp maintained constant, that is without a change. One reason for this is that in the previous forms the warning lamp is controlled by a drive independent of the drive for the cycle drive. In Fig. 23, however, as stated the yellow lamp is operated by cams carried on the timer shaft that controls the red and green lamps.

As illustrated diagrammatically in Fig. 23 the cam 150 operates the lever 151 for controlling the yellow or change lamp that comes on toward the end of the lighting of the red lamp R. This lamp is controlled by the cam 152 which is adjustable in length and one section of which is controlled by connection to the hand 35. The green lamp cam 153 is likewise made up of two sections which are varied in length by adjustment of the hand 37. The cam 154 which cooperates with the green lamp of cam 153, is also adjustable like the cam 150 to vary the period of lighting of the yellow lamp when it lights before the green lamp is extinguished.

It will thus be seen that although in the form shown in Fig. 23 the warning or change lamps may be varied as to their period of operation, this is done by individual adjustment of the cams 150 and 154 instead of by the simultaneous adjustment of all of the cams such as may be accomplished by the variable common driving means from the motor M'.

In the operation of Fig. 23, and assuming the apparatus is in the position indicated, the green and yellow lamps are lighted through the action of the cams 153 and 154, the timer shaft continuing its advance in the direction of the arrow indicated thereon. The two lamps are simultaneously extinguished and at the same time the red lamp becomes lighted through the action of cam 152. This continues until the cam 150 lights the yellow or change lamp, both of them remaining lighted until they are extinguished by the cams 150 and 152 releasing the actuated contacts.

Thus the various lamps are successively lighted and extinguished for each cycle and the time of the cycle may be varied and the period of each lamp varied as desired. In the mechanism illustrated, the signal control red and green lamps and the corresponding yellow or change lamps are lighted during overlapping periods, but as in connection with the other figures previously described, this overlapping may be eliminated and the different lamps successively lighted without overlapping. In the case of Fig. 23, this may be accomplished by adjusting the cams 150 and 154 so that they follow the cams 152 and 153, respectively, rather than to actuate the contacts during an overlapping period.

Also in Fig. 23 the individual timer mechanisms may be adjusted so that although all running on the same period of time cycle, the lamps come in at different periods so as to give the so-called coordinate timing for the various intersections throughout the controlled area. Or if desired, the different mechanisms may be adjusted so that they all control or actuate their corresponding signal lamps simultaneously. Various other adjustments may be made, as will be readily apparent.

Fig. 24

Figure 24:
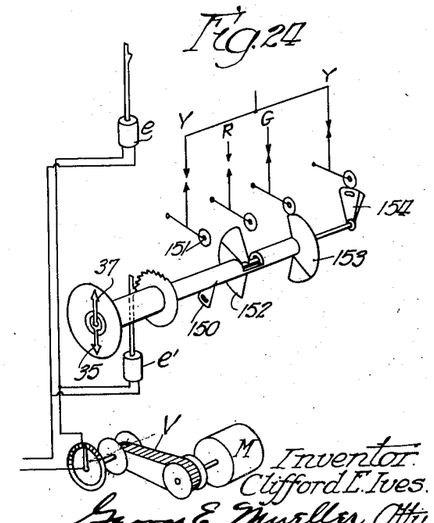
Fig. 24 shows timer units similar to that of Fig. 23 but electrically driven in synchronism.

In Fig. 24 I show another modified form of my invention in which the timer shaft and contacts controlled thereby are similar to the mechanism of Fig. 23, except that in Fig. 24 I have shown the common electrical drive so that the timers are driven in synchronism by the electrical impulses, the speed of which may be varied by the Reeves drive V so as to vary the time of cycle of the different timers. The timer mechanisms may all be stationed at a central office, or they may be distributed and located at the intersections controlled thereby or at any other convenient point. The operation of Fig. 24 and its various adjustments will be readily understood in view of the description of Fig. 23.

What I claim as new and desire to secure by United States Letters Patent is:

1. In a crossing traffic signal system, a mounting frame, a plurality of signal devices for giving different successive traffic signals, a plurality of signal control devices each for controlling the timing of signals of a corresponding crossing, said control devices being mounted on said frame in rows and columns corresponding to streets, the rows corresponding to parallel streets of one direction and the columns corresponding to parallel streets in another direction, each row representing a definite street of that direction and each column representing a street in the corresponding direction, whereby each intersection of the rows and columns on the board indicates the crossing controlled by the signal device at that intersection, means for operating said signal devices simultaneously but giving different signals on some streets than on others and an indicator on the face of the frame individual to each control device operating with the device whereby the timing of the signals for the crossings may be simultaneously observed.

2. In a crossing traffic signal system having a plurality of crossings, a mounting frame, a signal device for each crossing, a plurality of signal control devices each for controlling the timing of signals of a corresponding crossing, said devices being mounted on said frame in rows and columns corresponding to streets, the rows corresponding to parallel streets of one direction and the columns corresponding to parallel streets in another direction, each row representing a definite street of that direction and each column representing a street in the corresponding direction, whereby each intersection of the rows and columns on the board indicates the crossing controlled by the device at that intersection, means for synchronously operating said control devices, separate means for adjusting the timing of each of the signal devices at a crossing and means mounted on said frame for indicating the adjustment.

3. In a crossing traffic signal system, signal devices, a panel board, a plurality of adjustable timers each for cyclically controlling signals of a corresponding crossing, said timers each having a rotatable timer dial shaft and carrying a timer dial for indicating the adjustment of the timer, all of said dials being mounted upon the face of the panel board so as to be simultaneously observable, a common driving means for operating all of said timers in synchronism, and means for varying the speed of all the timers to shorten or lengthen the cycle of the signal.

4. In a crossing traffic signal system having a plurality of crossings, a signal device, a panel board, a plurality of timers each for controlling signal devices of a corresponding crossing, said timers each having a timer dial shaft and carrying a timer dial for indicating the adjustment of the timer, all of said dials being mounted upon the face of the panel board so as to be simultaneously observable, with the timer dial shaft extending rearwardly, a common driving shaft extending along the rear of the panel board and connected to said timer shafts to operate the same, and a source of power for driving the common shaft.

5. In a crossing traffic signal system having a plurality of crossings, signal devices, a panel board, a plurality of timers each for controlling signal devices of a corresponding crossing, said timers each having a timer dial shaft and carrying a timer dial, all of said dials being mounted in rows upon the face of the panel board so as to be simultaneously observable whereby the adjustment of the individual timers and the relationship of the adjustment of the different timers is readily observable, said timer dial shafts extending rearwardly through the panel, a common driving shaft for each row of timer shafts at the rear of the panel, and a common source of power connected to all the common driving shafts.

6. In a traffic control system having a plurality of intersections and of a character providing stop, go and warning signals at street intersections adapted to be changed in accordance with a predetermined cycle, a plurality of control mechanisms each for controlling the period of the signals at a corresponding street intersection in accordance with a predetermined cycle, means operating at constant speed for driving the control mechanisms in synchronism through successive revolutions corresponding to the signal cycle, means independently associated with each of the control mechanisms changing the period of the signals in the cycle and means common to all of the mechanisms for simultaneously varying the period of operation of the warning signals relative to the cycle.

7. In a traffic control system having a plurality of intersections and of a character providing stop, go and warning signals at street intersections, signal devices operable in accordance with a predetermined cycle, a plurality of control mechanisms each arranged to control the period of the signals making up the signal cycle at a street intersection, a common operable means for the control mechanism, and adjusting means for simultaneously varying the period of operating of all of the warning signals relative to the cycle.

8. In a traffic control system having a plurality of intersections and of a character providing stop, go and warning signals at street intersections, signal devices operable in accordance with a predetermined cycle, a plurality of control mechanisms each arranged to control the period of the signals making up the signal cycle at a street intersection, a common operable means for the control mechanism, adjusting means for simultaneously varying the period of operation of the warning signals relative to the cycle and additional adjusting means for simultaneously varying the duration of the cycle while maintaining the period of the warning signals constant.

9. In a traffic control system having a plurality of intersections and of a character providing stop, go and warning signals at street intersections, signal devices operable in accordance with a predetermined cycle, a mounting frame, a plurality of signal control mechanisms mounted on the frame each for controlling signals at a corresponding street intersection, means mechanically connected with the control mechanisms for driving the mechanisms in synchronism through successive like cycles or predetermined length of time, means individual to each mechanism operable from the face of the frame for varying the period of operation of the signals within the cycle and means for simultaneously varying the time of the cycles for all said mechanisms.

10. In a traffic control system having a plurality of intersections and of a character providing stop, go and warning signals at street intersections, signal devices operable in accordance with a predetermined cycle, a plurality of signal control mechanisms synchronously operated from a common driving means including power source of constant speed and each arranged to successively operate signals at the street intersections through cycles having the same duration of time, adjusting means for each mechanism for independently varying the period of the operation of the traffic signals making up the cycle, common adjusting means for varying the duration of all of the cycles, and adjusting means for varying the period of operation of the warning signals while maintaining the time of the cycle constant.

11. In a traffic control system providing signals of different character as stop, go and warning signals at street intersections, signal devices operable in accordance with a predetermined cycle, a central control mechanism for governing the duration of the light cycles at various street intersections, said central control mechanism including a mounting panel, a plurality of timers secured to the back of the mounting panel each for operating signals at a particular street intersection, a common driving means for operating all of the timers, and individual means each operable with a single one of the timers and secured on the front of the mounting panel for indicating the period of the signals in the cycle at any one of the street intersections controlled by the central mechanism, said indicating means conforming generally with the arrangement of the streets.

12. In a traffic control system of a character providing stop, go and warning signals at street intersections, signal devices operable in accordance with a predetermined cycle, a central control mechanism comprising a mounting panel, a plurality of timers each for controlling a particular street intersection, switch mechanisms one operable by each timer and adapted to be turned to change the signals from stop to go and vice versa, common means for driving all of the switches intermittently, means forming a part of the timer for setting the switch driving means into operation and means for controlling the timer to regulate the time at which said driving means turns the switch.

13. In a traffic control system of a character providing stop, go and warning signals at street intersections, signal devices operable in accordance with a predetermined cycle, a central control mechanism comprising a mounting panel, a plurality of timers each for controlling a particular street intersection, switch mechanisms one operable by each timer and adapted to be turned to change the signals from stop to go and vice versa, common means for driving all of the switches intermittently, means forming a part of the timer for setting the switch driving means into operation, means for controlling the timer to regulate the time at which said driving means turns the switch, the means being provided for giving the warning signal during the time the switch is turned by the separate driving means, and the duration of all of the warning signals being regulated by controlling the speed of said driving means.

14. In a traffic control system of a character providing stop, go and warning signals at street intersections, signal devices operable in accordance with a predetermined cycle, a central control mechanism comprising a mounting panel, a plurality of timers each for controlling a particular street intersection, switch mechanisms one operable by each timer and adapted to be turned to change the signals from stop to go and vice versa, common means for driving all of the switches intermittently, means forming a part of the timer for setting the switch driving means into operation and means for controlling the timer to regulate the time at which said driving means turns the switch, the manner in which the timers affect the operation of the switch throwing mechanism being controlled by means provided on the face of the board for such purposes.

15. In a traffic control system providing signals of different character as stop, go and warning signals at street intersections, signal devices operable in accordance with a predetermined cycle, a central control mechanism comprising a mounting panel, a plurality of timers each for controlling a particular street intersection, switch mechanisms one operable by each timer and adapted to be turned to change the signals from stop to go and vice versa, common means for driving all of the switches intermittently, means forming a part of the timer for setting the switch driving means into operation and means for controlling the timer to regulate the time at which said driving means turns the switch, means for varying the speed of travel of all of the timers to change the duration of the signal cycle and means for controlling the period of the signals in the cycle for each timer individually from the front of the board.

16. In a traffic control system having a plurality of intersections and of a character providing stop, go and warning signals at street intersections, signal devices operable in accordance with a predetermined cycle at each intersection, a central control mechanism, a mounting panel, a plurality of timers mounted thereon, drive means for the timers, and means on the face of the mounting panel for controlling the timers and common driving means for all of the timers adjustable to change the duration of the signals within the cycle in accordance with the requirements of the traffic.

17. In a traffic signal system, a plurality of distributed signal devices operable to give signals of different character as stop and go signals, a central control station, a timing unit for each signal device at the control station for operating the signals in a predetermined cycle, and means for indicating the period of the cycle of each signal of the cycle at the control station and means supporting the individual indicating means whereby individual streets and intersections thereof and the operation of timers with control thereof may be readily correlated.

18. In a traffic signal system, a plurality of distributed signal devices operable to give signals of different character as stop and go signals, a central control station, a timing unit for each signal device for operating the signals in a predetermined cycle, all of said units being interconnected to maintain a predetermined speed relation, means for varying the relative time phases of said units whereby the phase of any signal device may be varied with respect to the phase of another signal device, and means for indicating the phase of each signal device at the control station the individual indicating means being grouped to correspond in general with the arrangement and location of the distributed signal devices.

19. In a crossing traffic signal system, a mounting frame, a plurality of signal devices for giving different successive traffic signals, a plurality of signal control devices each for controlling the timing of signals of a corresponding crossing, said control devices being mounted on said frame in a row corresponding to the street in which the corresponding crossings occur, whereby each intersection of cross streets with said street is indicated by the row of timers, means for operating said signal devices simultaneously but giving different signals on some crossings of said street than on others, and an indicator on the face of the frame individual to each control device operating with the device, wherebly the timing of the signals for the crossings may be simultaneously observed.

20. In a crossing traffic signal system, a mounting frame, a plurality of signal devices for giving different successive traffic signals, a plurality of signal control devices each for controlling the timing of signals of a corresponding crossing, said control devices being mounted on said frame in a row corresponding to the street in which the corresponding crossings occur, whereby each intersection of cross streets with said street is indicated by the row of timers, means for operating said signal devices simultaneously but giving different signals on some crossings of said street than on others, separate means for adjusting the timing of each of the signal devices at a crossing and means mounted on said frame for indicating the adjustment.

21. In a crossing traffic signal system having a plurality of crossings, signal devices, a panel board, a plurality of timers each for controlling a signal device of a corresponding crossing, said timers each having a timer dial shaft and a plurality of adjustable control members supported on the dial shaft, a timer dial for indicating the adjustment of the timer carried by each timer dial shaft, all of said dials being mounted upon the face of the panel board so as to be simultaneously observable with the timer dial shaft extending rearwardly, hands supported upon the dial shaft and having connections to said adjustable control members whereby the position of the hands on the dials indicates the position of such members, a common driving shaft extending along the rear of the panel board and connected to said timer shafts to operate the same, and a source of power for driving the common shaft, the dials being so grouped and positioned on the panel board so as to facilitate observation of the timers for a particular street or section and whereby the timers controlling such particular street or intersection are readily adjustable.

22. In a crossing traffic signal system adapted for controlling a plurality of signal devices located at street intersections, a central control mechanism comprising a plurality of adjustable timers each for controlling one of said signal devices, a panel board, and a plurality of indicators, each connected to a timer and having means to disclose the adjustment and operation of its particular timer, said indicators grouped in general conformity with the street intersections at which the signal devices are located and means to operate said timers in definite relationship.

23. In a crossing traffic signal system adapted for controlling a plurality of signal devices located at street intersections, a central control mechanism comprising a panel board, timers grouped on the panel board and having individual electric switching mechanism, means for driving said timers, a second panel board, a plurality of sockets disposed on the second panel board, electrical conductors interconnecting said switching mechanisms and sockets, a second set of sockets having electrical contacts, electrical conductors connected to said electrical sockets and running to said signal devices, and cables each provided with a plug at each end, whereby any pair of sockets in the first and second mentioned groups of sockets may be interconnected.

24. A system as defined in claim 23, wherein each of said timers is provided with an indicator mounted on the face of said first mentioned panel, and said first timers, indicators and first mentioned group of sockets are all arranged in general conformity with the street intersections.

25. A system as defined in claim 23, wherein each of said timers is provided with an indicator mounted on the face of said first mentioned panel, and said first timers, indicators and first mentioned group of sockets are all arranged in general conformity with the street intersections, and including a plurality of auxiliary timers and indicators, and sockets to which the switching mechanisms of the timers are connected, whereby on failure of any timer, one of said auxiliary timers may be made available immediately by means of said plug connections.

26. In a traffic system for a plurality of intersections of related streets, a group of traffic control signals at each controlled intersection, a plurality of means, each operative for displaying the signals of a group periodically in cycles for the routine control of traffic, means for maintaining the operation of said plurality of means in the definite relationship whereby the cyclic display at intersections are correlated, means individual to each of said plurality of means for adjusting them whereby to vary the display period of said signals within a cycle, a central station, and means at said central station to indicate individually for each group the display period of the signals of that group.

27. A traffic signal system as defined in claim 26, including means for mounting said last named indicating means in general conformity with the street intersections at which the signals are located.

CLIFFORD E. IVES.